(12) United States Patent
Dutta et al.

(10) Patent No.: US 11,729,808 B2
(45) Date of Patent: Aug. 15, 2023

(54) SIDELINK FR2 INTER-UE INTERFERENCE MANAGEMENT

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Chester, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/137,272

(22) Filed: Dec. 29, 2020

(65) Prior Publication Data

US 2022/0210788 A1  Jun. 30, 2022

(51) Int. Cl.
*H04W 72/541* (2023.01)
*H04W 76/27* (2018.01)
(Continued)

(52) U.S. Cl.
CPC ......... *H04W 72/541* (2023.01); *H04L 5/0048* (2013.01); *H04W 48/08* (2013.01); *H04W 76/27* (2018.02)

(58) Field of Classification Search
CPC ... H04W 72/082; H04W 48/08; H04W 76/27; H04W 72/0406; H04W 76/23;
(Continued)

(56) References Cited

U.S. PATENT DOCUMENTS

2020/0314770 A1* 10/2020 Wu ........................... H04L 5/10
2021/0314965 A1* 10/2021 Hui ........................ H04W 72/20
(Continued)

FOREIGN PATENT DOCUMENTS

| EP | 3836687 A1 | 6/2021 |
|---|---|---|
| WO | 2019148190 A1 | 8/2019 |
| WO | 2020030116 A1 | 2/2020 |

OTHER PUBLICATIONS

Jung et al., "Reducing Consecutive Collisions in Sensing Based Semi Persistent Scheduling for Cellular V2X", Nov. 2019, Department of Electrical and Computer Engineering Ajou University (Year: 2019).*

(Continued)

*Primary Examiner* — Justin T Van Roie
(74) *Attorney, Agent, or Firm* — Procopio, Cory, Hargreaves & Savitch LLP

(57) ABSTRACT

A first UE may determine to communicate with a second UE, but may maintain or establish a RRC connection with a third UE upon determining that potential interference may occur between the first UE and the third UE. The potential inference may be a received interference in which the first UE receives interference from the third UE as a result of a communication between the third UE and a fourth UE, or a transmitted interference in which the first UE causes interference to the third UE as a result of a communication between the first UE and the second UE. The first UE may communicate mitigation information to the third UE through the RRC connection, where the interference mitigation information may be associated with the communication between the first UE and the second UE or the communication between the third UE and the fourth UE.

58 Claims, 9 Drawing Sheets

(51) Int. Cl.
*H04L 5/00* (2006.01)
*H04W 48/08* (2009.01)

(58) Field of Classification Search
CPC .... H04W 76/14; H04W 76/25; H04L 5/0048; H04L 5/0073
See application file for complete search history.

(56) References Cited

U.S. PATENT DOCUMENTS

| | | | | |
|---|---|---|---|---|
| 2021/0368372 | A1* | 11/2021 | Chen | H04W 76/14 |
| 2022/0322229 | A1* | 10/2022 | Ye | H04W 76/14 |
| 2022/0393780 | A1* | 12/2022 | Jung | H04W 52/10 |

OTHER PUBLICATIONS

International Search Report and Written Opinion—PCT/US2021/057437—ISA/EPO—dated Mar. 3, 2022.
ITRI: "Discussion on NR Sidelink Enhancements", 3GPP TSG RAN WG1 #103-e, 3GPP Draft, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 2 Pages, Oct. 20, 2020 (Oct. 20, 2020), XP051940700, Retrieved from the Internet: URL: https://ftp.3gpp.org/tsg_ran/WG1_RL1/TSGR1_103-e/Docs/R1-2007881.zip R1-2007881.docx [retrieved on Oct. 20, 2020] Subclause 2.1 Views on mode realibility enhancement.

* cited by examiner

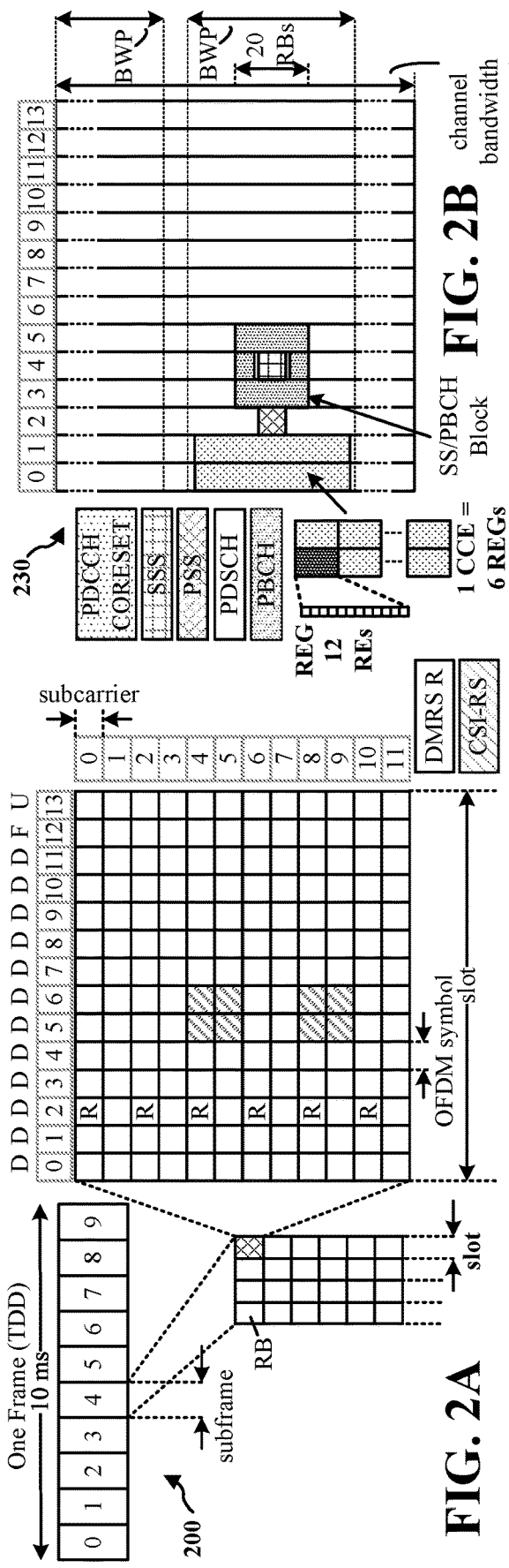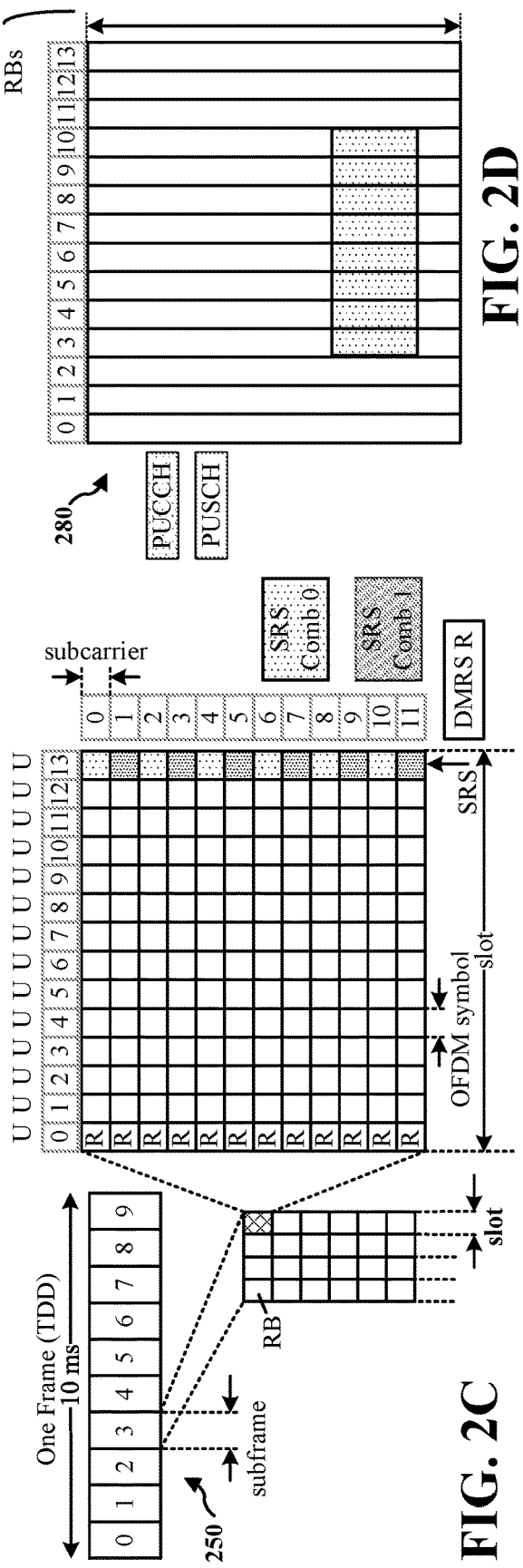
FIG. 2A  FIG. 2B  FIG. 2C  FIG. 2D

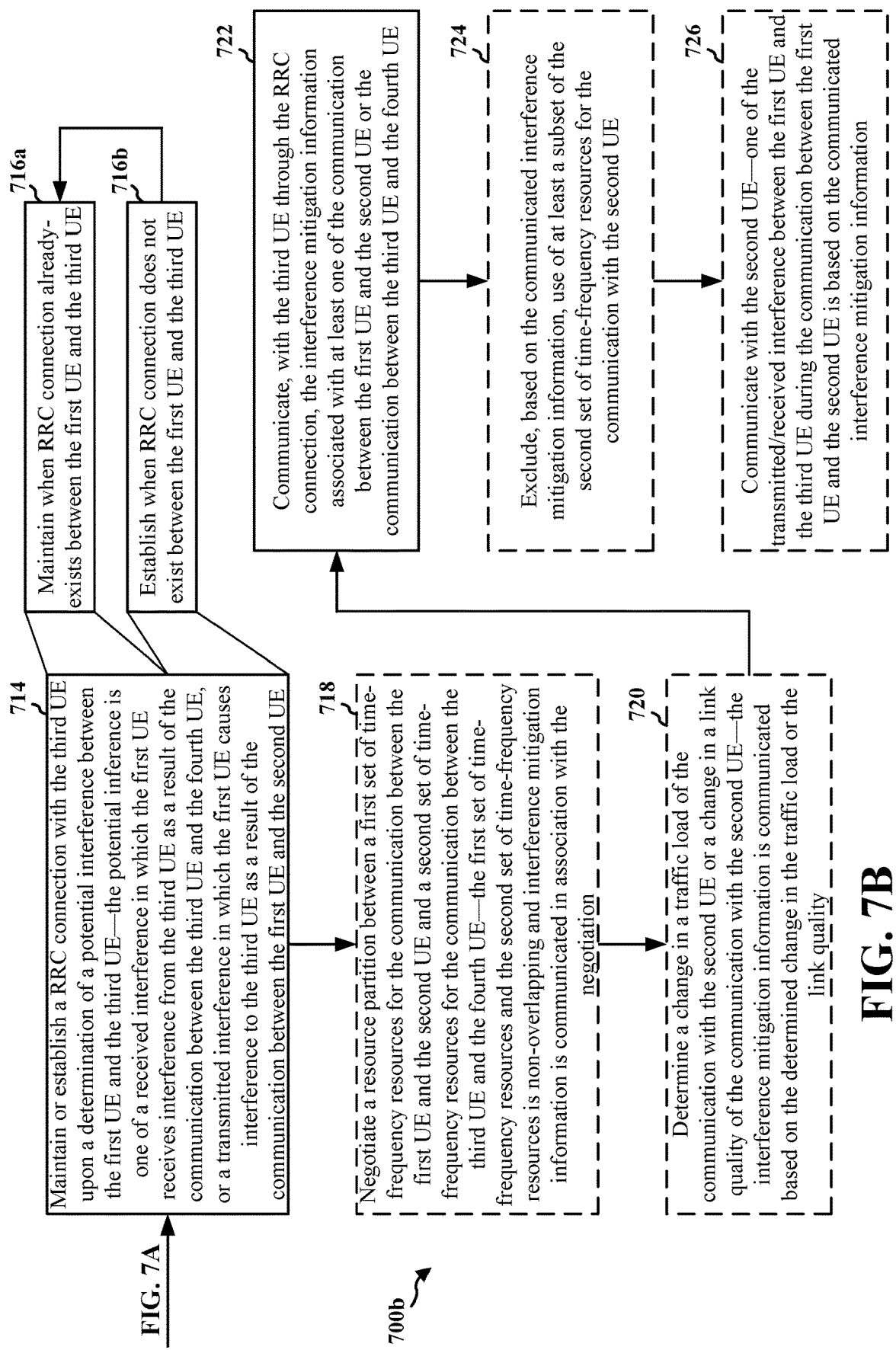

SIDELINK FR2 INTER-UE INTERFERENCE MANAGEMENT

BACKGROUND

Technical Field

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first user equipment (UE) that determines to communicate with a second UE may locate the second UE based on a beam sweeping procedure. As each UE of a network may be configured to perform beam sweeping procedures at predetermined times, the first UE may assume that other UEs of the network, such as a third UE, are likewise listening for the sweeping beams transmitted by the first UE. In some cases, a first communication link between the first UE and the second UE may receive interference from communications between the third UE and a fourth UE. In other cases, communications between the first UE and the second UE may cause interference to a second communication link between the third UE and the fourth UE.

Accordingly, even if the first UE and the third UE do not intend to communicate data with each other, the first UE and the third UE may determine to be radio resource control (RRC) connected for managing potential interference to the first communication link and/or the second communication link. If the first UE and the third UE already have an existing RRC connection with each other, the first UE and the third UE may maintain the RRC connection. If the first UE and the third UE do not have an existing RRC connection with each other, the first UE and the third UE may establish the RRC connection. The potential interference may be decreased or avoided based on interference mitigation information communicated between the first UE and the third UE via the RRC connection. For example, the interference mitigation information may indicate an adjustment to time-frequency resources that are to be used by each of the UEs.

In an aspect of the disclosure, a method, a computer-readable medium, and an apparatus are provided. The apparatus may be associated with a first UE and may be configured to: determine to communicate with a second UE; maintain or establish a RRC connection with a third UE upon a determination of a potential interference between the first UE and the third UE, the potential inference being one of a received interference in which the first UE receives interference from the third UE as a result of communication between the third UE and a fourth UE, or a transmitted interference in which the first UE causes interference to the third UE as a result of communication between the first UE and the second UE; and communicate, with the third UE through the RRC connection, interference mitigation information associated with at least one of the communication between the first UE and the second UE or the communication between the third UE and the fourth UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 7A-7B are flowcharts for a method of wireless communication of a UE.

DETAILED DESCRIPTION

Figure 1:
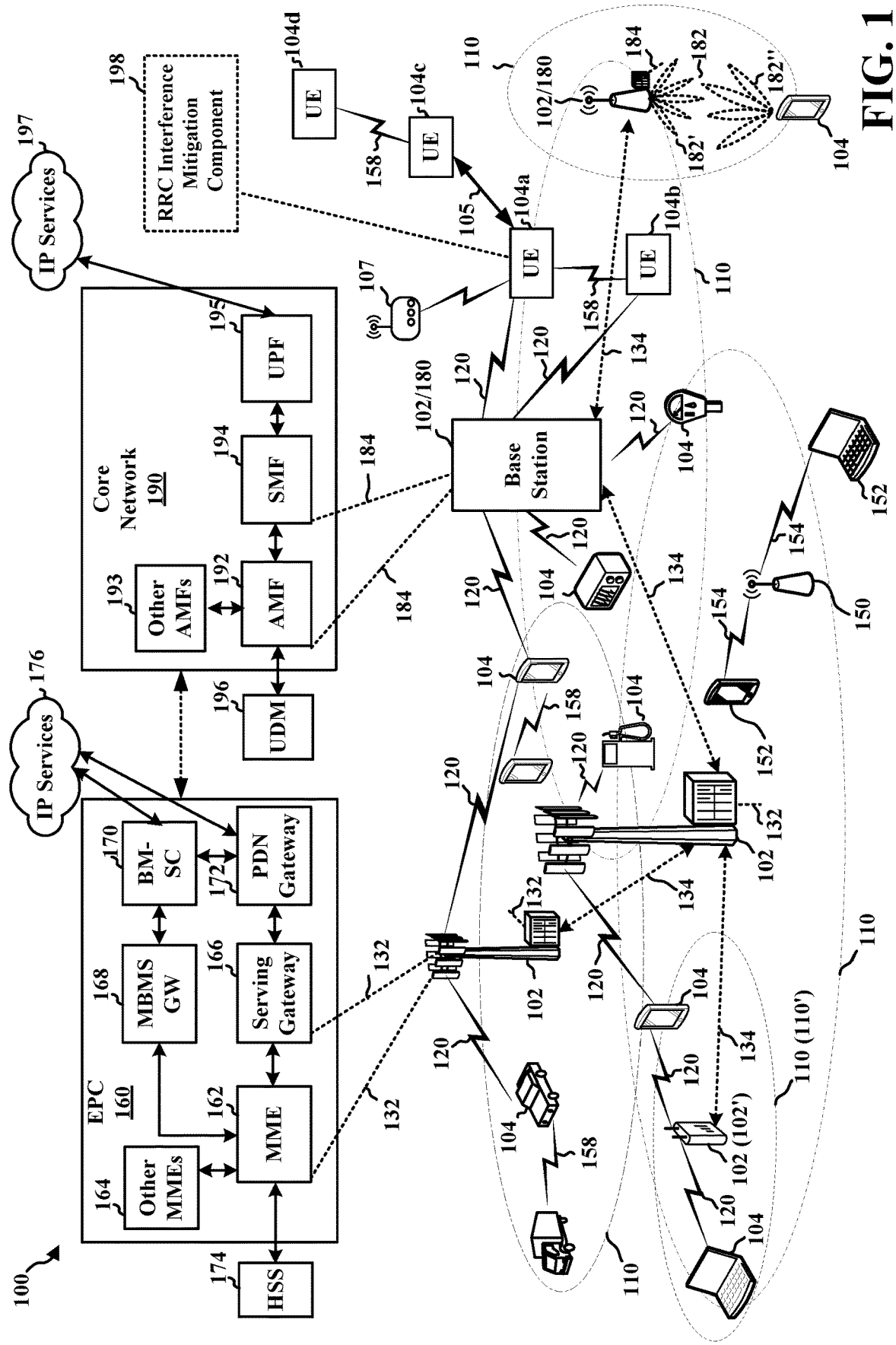
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V21) (e.g., from the vehicle-based communication device to road infrastructure nodes such as a Road Side Unit (RSU)), vehicle-to-network (V2N) (e.g., from the vehicle-based communication device to one or more network nodes, such as abase station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104 such as a first UE 104a, or other device communicating based on sidelink, may include a radio resource control (RRC) interference mitigation component 198 configured to determine to communicate with a second UE 104b; maintain or establish a RRC connection 105 with a third UE 104*c* upon a determination of a potential interference between the first UE 104*a* and the third UE 104*c*, the potential inference being one of a received interference in which the first UE 104*a* receives interference from the third UE 104*c* as a result of communication between the third UE 104*c* and a fourth UE 104*d*, or a transmitted interference in which the first UE 104*a* causes interference to the third UE 104*c* as a result of communication between the first UE 104*a* and the second UE 104*b*; and communicate, with the third UE 104*c* through the RRC connection 105, interference mitigation information associated with at least one of the communication between the first UE 104*a* and the second UE 104*b* or the communication between the third UE 104*c* and the fourth UE 104*d*.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
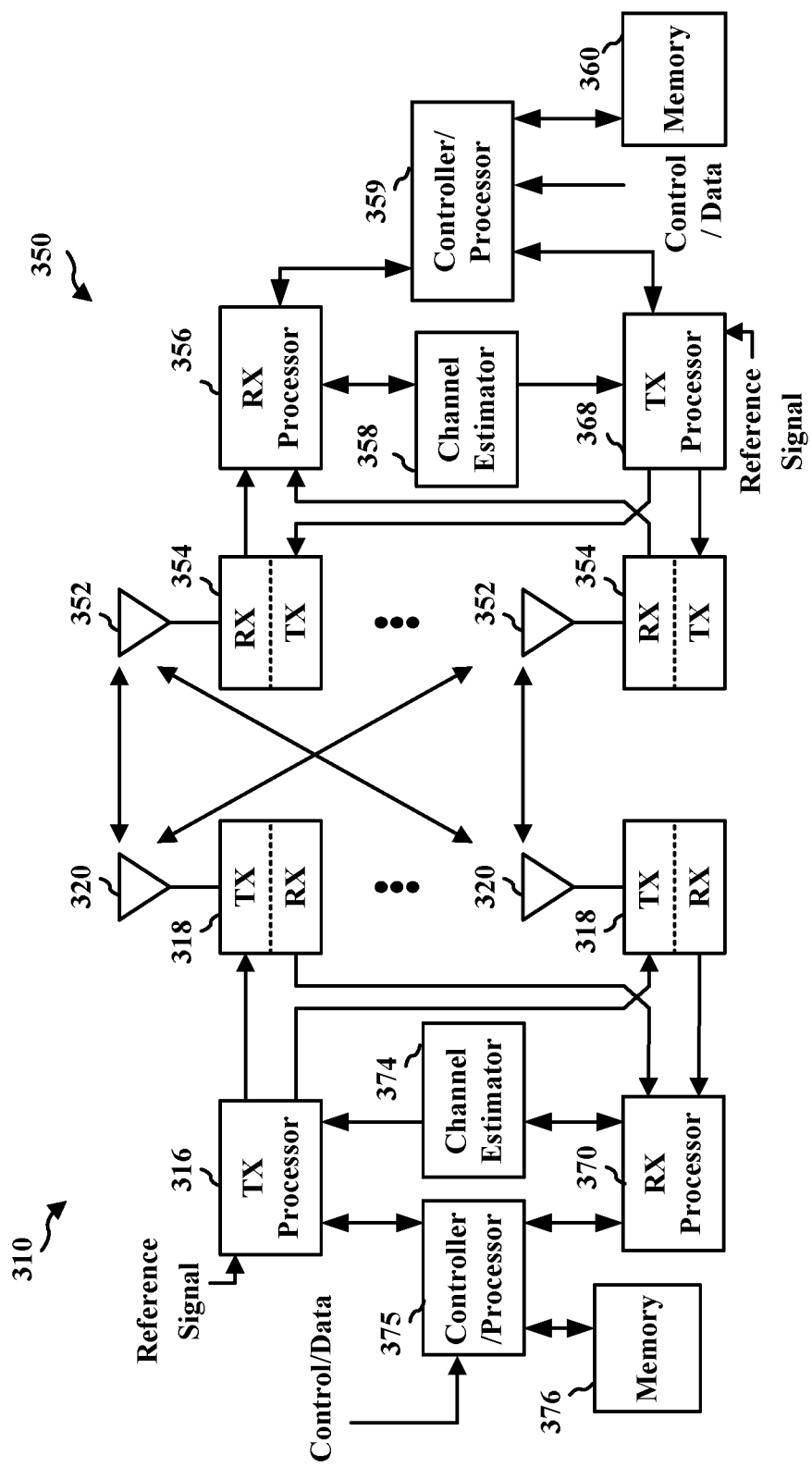
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the RRC interference mitigation component 198 of FIG. 1.

Figure 4:
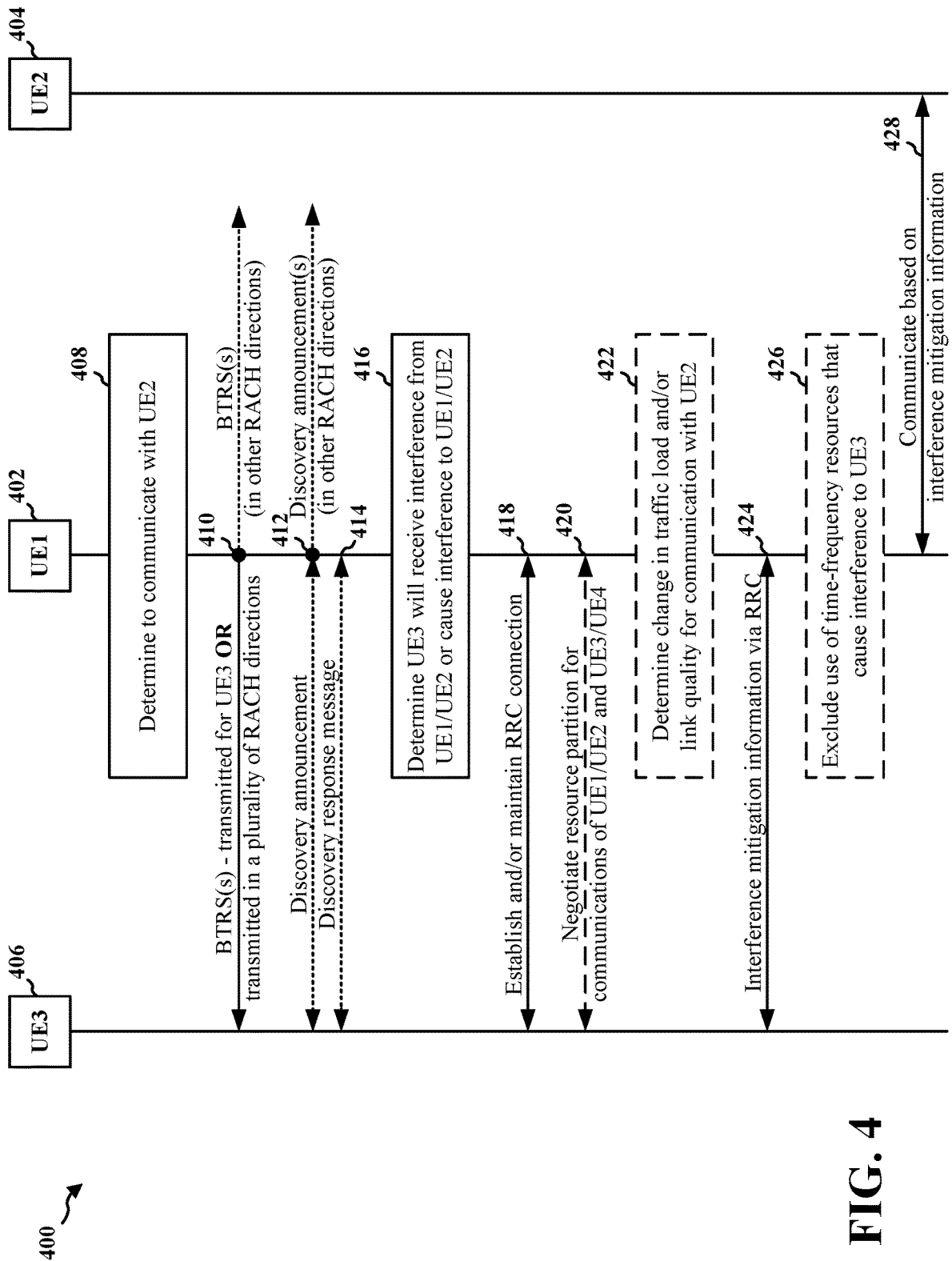
FIG. 4 is a call flow diagram illustrating communications between a first user equipment (UE), a second UE, and a third UE.

FIG. 4 is a call flow diagram 400 illustrating communications between a first UE 402 (e.g., UE1), a second UE 404 (e.g., UE2), and a third UE 406 (e.g., UE3). At 408, the first UE 402 may determine to communicate with the second UE 404. Thus, the first UE 402 may perform a beam sweeping procedure to locate the second UE 404 and determine a beam to be used for communicating with the second UE 404.

Each UE of the network may be configured to perform beam sweeps during network-wide/system-wide beam training periods. As such, the first UE 402 may assume that other UEs of the network, such as the third UE 406, are also listening for the sweeping beams transmitted by the first UE 402. If the third UE 406 is directionally close to the first UE 402, the third UE 406 may receive, at 410, a beam training reference signal (BTRS) from the first UE 402 for performing a beam training procedure with the first UE 402. Based on the beam training procedure, the third UE 406 may transmit, at 412, a discovery announcement to the first UE 402. At 414, the first UE 402 may transmit, to the third UE 406, a discovery response message indicative of whether the first UE 402 intends to communicate data with the third UE 406 based on the discovery announcement received, at 412, from the third UE 406.

In some cases, communication with the other UEs of the network, such as the third UE 406, may be triggered based on the first UE 402 transmitting, at 410, the BTRSs in a plurality of RACH directions. Thus, a first BTRS may be transmitted, at 410, toward the third UE 406, while other BTRSs may be transmitted, at 410, in other RACH directions. The first UE 402 may similarly transmit, at 412, a discovery announcement in the plurality of RACH directions, such that a first discovery announcement may be transmitted, at 412, toward the third UE 406, while other discovery announcements may be transmitted, at 412, in the other RACH directions. At 414, the first UE 402 may receive, from the third UE 406, a discovery response message indicative of whether the third UE 406 intends to communicate data with the first UE 402 based on the discovery announcement received, at 412, from the first UE 402.

At 416, the first UE 402 may determine that the third UE 406 will either receive interference from the communication between the first UE 402 and the second UE 404 or cause interference to the communication between the first UE 402 and the second UE 404. In aspects, the third UE 406 may additionally or alternatively make a similar determination about the first UE 402. Thus, even if the first UE 402 and the third UE 406 do not intend to communicate data with each other, the first UE 402 and the third UE 406 may determine to be RRC connected for managing potential interference via interference mitigation techniques. If the first UE 402 and the third UE 406 already have an existing RRC connection, the first UE 402 and the third UE 406 may maintain, at 418, the RRC connection with each other. If the first UE 402 and the third UE 406 do not have an existing RRC connection, the first UE 402 and the third UE 406 may establish, at 418, the RRC connection with each other, which may thereafter continue to be maintained by the first UE 402 and the third UE 406.

At 420, the first UE 402 and the third UE 406 may negotiate a resource partition for first communications between the first UE 402 and the second UE 404 and second communications between the third UE 406 and a fourth UE (e.g., UE4). For example, the first communications may be based on a first set of time-frequency resources and the second communications may be based on a second set of time-frequency resources, where the first set of time-frequency resources and the second set of time-frequency resources may be separated based on the negotiated partition. In some instances, changes in network conditions may provide a basis for adjusting the negotiated resource partition. For example, the first UE 402 may determine, at 422, a change in traffic load for communications with the second UE 404 and/or a change in a link quality for communications with the second UE 404.

At 424, the first UE 402 and/or the third UE 406 may communicate interference mitigation information to each other via the RRC connection established/maintained, at 418, by the first UE 402 and the third UE 406. The interference mitigation information may indicate a first set of time-frequency resources to be utilized by the first UE 402 for communicating with second UE 404 which are subject to potential interference from the third UE 406, or a second set of time-frequency resources to be utilized by the third UE 406 for communicating with the fourth UE which are subject to potential interference from the first UE 402. At 426, the first UE 402 may exclude use of at least a subset of the second set of time-frequency resources when the first UE 402 determines that use of such resources may cause interference to communications of the third UE 406. At 428, the first UE 402 may communicate with the second UE 404 based on the interference mitigation information communicated, at 424, between the first UE 402 and the third UE 406 via the RRC connection.

Figure 5:
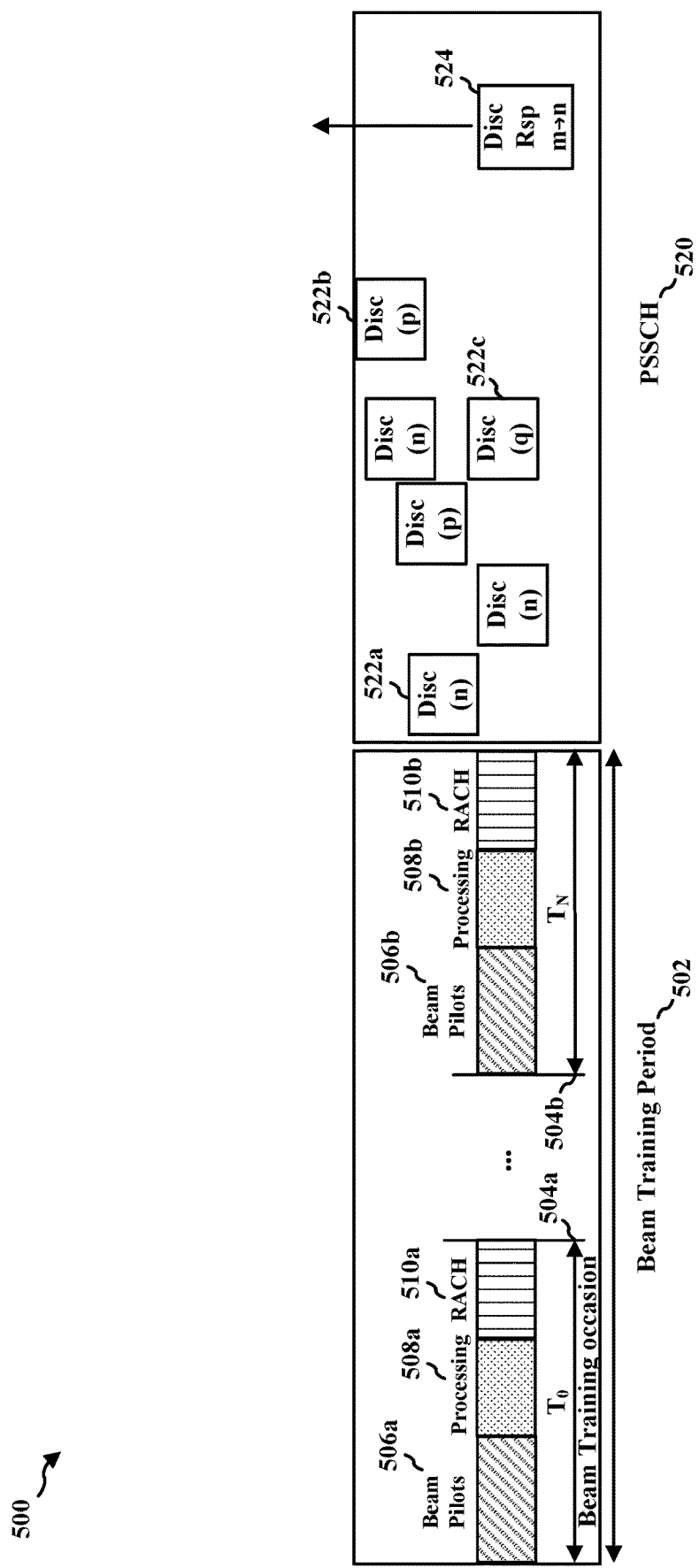
FIG. 5 illustrates a diagram associated with sidelink discovery techniques for frequency range 2 (FR2).

FIG. 5 illustrates a diagram 500 for a sidelink discovery technique for frequency range 2 (FR2). FR2 transmissions may be beamformed based on a pathloss caused by high frequencies, as beamforming techniques may increase a range of a wireless link. Spatial filtering may be similarly performed to increase the range of the wireless link. In contrast to FR2, frequency range 1 (FR1) links may be transmitted omnidirectionally or based on a wider beam. Prior to communicating over a FR2 link, communicating nodes may perform an initial beam discovery procedure and/or beam alignment procedure. For example, a search for nodes of a network may be performed to configure an initial beam pair link (BPL). UEs that communicate via sidelink may form a plurality of BPLs with a plurality of peer UEs, as opposed to each of the UEs forming a BPL via a Uu link with a central entity such as a base station. Thus, an initial beam discovery procedure for BPLs of a distributed network may have a higher overhead than discovery procedures based on the Uu link.

A beam training period 502 for establishing an initial BPL may also be longer than a time period for establishing the Uu link. The beam training period 502 may be based on one or more beam training occasions 504a-504b, which may be repeated over the beam training period 502. For example, a first beam training occasion 504a (e.g., $T_0$) including first beam pilots 506a, a first processing procedure 508a, and a first random access channel (RACH) procedure 510a may be repeated up to an Nth beam training occasion 504b (e.g., $T_N$) including Nth beam pilots 506b, an Nth processing procedure 508b, and an Nth RACH procedure 510b. Each of the first beam training occasion 504a through the Nth beam training occasion 504b may be based on network-wide/system-wide beam training resources and may be configured as RACH or RACH-less beam training occasions.

The beam training period 502 may allow the UE to determine a set of beams that the UE may use to connect to a peer UE. Upon establishing the initial BPL, the UE may use the PSSCH 520 to transmit/receive one or more beam discovery announcements/advertisements 522a-522c via FR2 for standalone devices. In some configurations, the discovery announcements/advertisements 522a-522c may be communicated via FR1 for non-standalone devices. The discovery announcements/advertisements 522a-522c may indicate during a data period associated with the PSSCH 520 that the UE has data to transmit on one or more beam directions and/or data to receive on one or more beam directions for which the UE may listen for a message from a peer UE. The one or more directions may correspond to direction(s) that the discovery announcements/advertisements 522a-522c that were transmitted by the UE. For example, discovery (disc) (n) 522a may be a discovery message associated with three beam directions, disc (p) 522b may be a discovery message associated with two beam directions, and disc (q) 522c may be a discovery message associated with one beam direction. Based on the discovery announcements/advertisements 522a-522c having a pattern indicative of the one or more beam directions, the UE may receive a discovery response message 524 from a peer UE indicative of whether the peer UE authorizes a data communication with the UE. For example, UE-n may receive the discovery response message 524 from UE-m, where UE-n is the announcing/advertising UE and UE-m is the responding UE. If the data communication is authorized by the peer UE, the UEs may initiate a RRC connection to perform the data communication.

Figure 6:
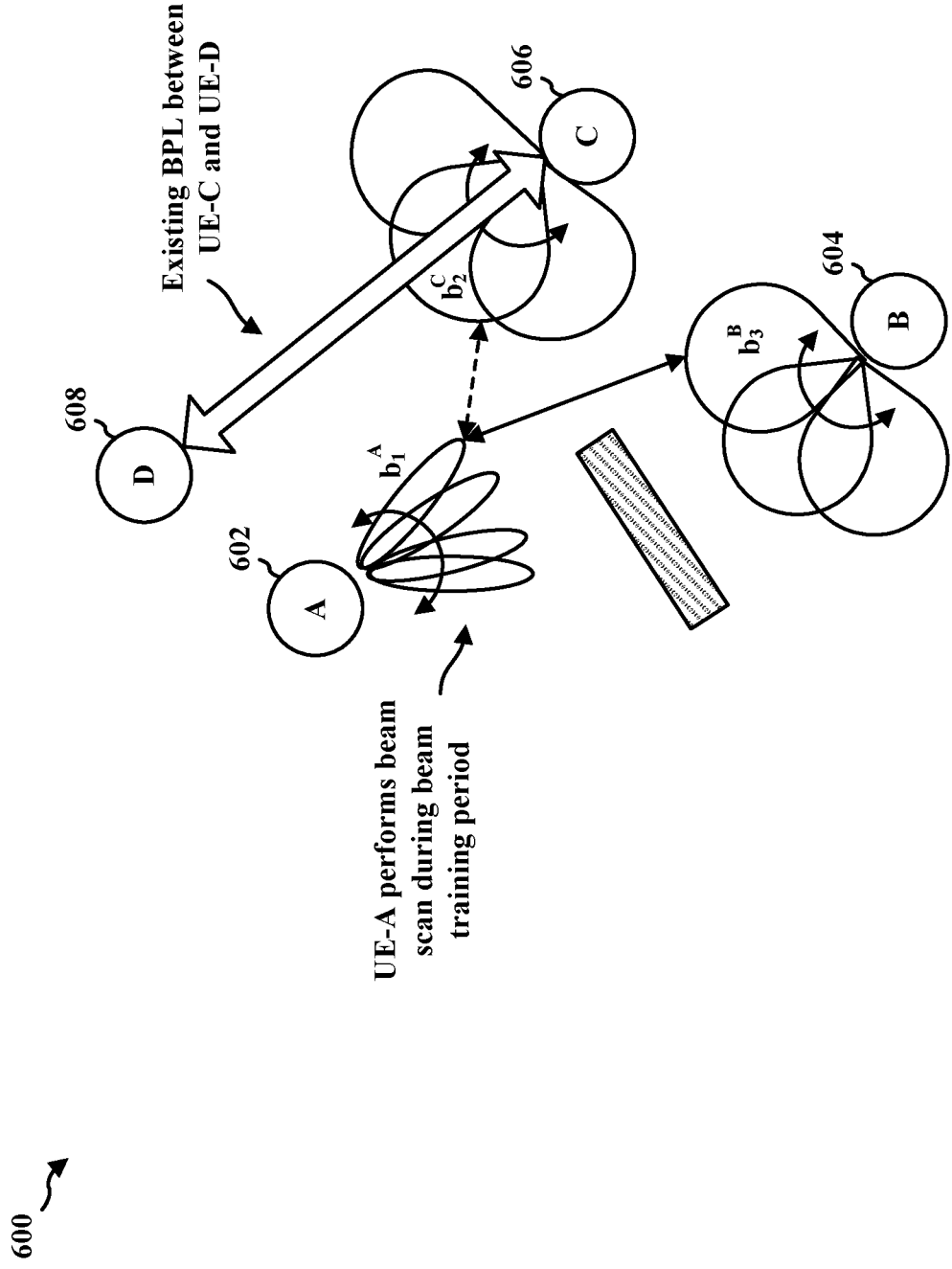
FIG. 6 illustrates a diagram for an interference management technique of a UE.

FIG. 6 illustrates a diagram 600 for an interference management technique of a UE. In an example, UE-A 602 may perform a Tx beam sweep that locates UE-B 604 for a data communication. That is, UE-A 602 may perform a beam scan during the beam training period. UE-B 604 may similarly perform a Rx beam sweep for which UE-A 602 may determine that beam 1 of the Tx beam sweep (4) performed by UE-A 602 may be used to communicate data to UE-B 604. As such, a RRC connection may be established between UE-A 602 and UE-B 604. Each UE of the network may be configured to perform a beam sweep during the beam training period, such that UE-A 602 may assume that UE-B 604, UE-C 606, and UE-D 608 may be listening for the sweeping beams transmitted by UE-A 602. Each of the UEs 604-608 may be further configured to transmit a RACH on a dominant Rx beam direction. For example, UE-B 604 may transmit a RACH to UE-A 602 on beam 3 of the Rx beam sweep (4) performed by UE-B 604, UE-C 606 may transmit a RACH to UE-A 602 on beam 2 of the Rx beam sweep ($b_2^c$) performed by UE-C 606, etc.

In configurations, UE-A 602 may receive discovery announcements/advertisements from each of UE-B 604, UE-C 606, and UE-D 608, but may determine to perform the data communication with only UE-B 604. Thus, UE-A 602 may transmit a discovery response message to UE-B 604 authorizing the data communication with UE-B 604. UE-A 602 may likewise transmit a discovery response message to UE-C 606 and UE-D 608 indicating that UE-A 602 does not intend to listen and/or transmit data to/from UE-C 606 and UE-D 608.

Accordingly, a transmission from UE-A 602 may interfere with an existing BPL between UE-C 606 and UE-D 608 and transmissions of UE-C 606 and UE-D 608 may interfere with a BPL between UE-A 602 and UE-B 604. For example, if UE-A 602 transmits data on $b_1^A$ to UE-B 604, the transmission on $b_1^A$ may cause a threshold level of interference at UE-C 606 based on a transmission being received from UE-D 608 over the existing BPL between UE-C 606 and UE-D 608. However, because BPL establishment was already initiated between UE-A 602 and UE-C 606 as well as between UE-A 602 and UE-D 608 and the UEs 602/606/608 have already determined respective beam transmission directions of the UEs 602/606/608, establishing and maintaining a RRC connection between each of the UEs 602/606 and 602/608 may provide a mechanism for mitigating interference at the UEs 602/606/608 when communications are not coordinated by a central entity, such as a base station.

A UE may be discovered via two different discovery procedures. A first discovery procedure (e.g., Model A discovery) may be based on the discovery announcement/advertisement being received from one or more peer UEs (e.g., 604-608) that receive a BTRS transmitted by the UE (e.g., 602). For example, upon receiving the discovery announcement/advertisement from one or more of UE-B 604, UE-C 606, or UE-D 608, UE-A 602 may determine a first set of peer UEs (e.g., 604) for which to perform a data communication and transmit a discovery response message to the first set of peer UEs that authorizes data communication with UE-A 602. A RRC connection may be subsequently established with the each UE of the first set of peer UEs for communicating the data.

UE-A 602 may further determine a second set of peer UEs (e.g., 606-608) for which the UE-A 602 does not authorize the data communication but may be interested in establishing and maintaining a RRC connection for performing interference mitigation. Such UEs may include directionally close beams to the beams of UE-A 602 and may be determined based on a received RACH. If a peer UE is identified for interference mitigation an existing RRC connection with the peer UE is already established, the existing RRC connection may be maintained between UE-A 602 and the peer UE. If a peer UE identified for interference mitigation does not include an existing RRC connection with UE-A 602, a RRC connection may established for interference mitigation/management procedures.

A second discovery procedure (e.g., Model B discovery) may be based on the UE that transmits the BTRS sending a discovery announcement/advertisement in all RACHed directions. Each peer UE (e.g., 604-608) that receives the discovery announcement/advertisement from UE-A 602 may determine whether to authorize a data communication with UE-A 602 or whether to maintain a RRC connection with UE-A 602 for interference management procedures. Each peer UE may indicate their respective determinations to UE-A 602 via separate discovery response messages. Accordingly, a RRC connection may be maintained/established based on the discovery response messages. If a peer UE is identified for interference mitigation and includes an existing RRC connection with UE-A 602, the existing RRC connection may be maintained. If a peer UE identified for interference mitigation does not include an existing RRC connection with UE-A 602, a RRC connection may be established with UE-A 602 for interference management procedures.

Interference mitigation may be performed by the UEs 602-608 based on an indication of subsequent periodic transmissions. For example, if UE-A 602 is expecting to receive future periodic transmissions over a beam that receives interference from UE-C 606 having a maintained RRC connection with UE-A 602, a periodicity of the transmission and/or a time division duplex (TDD) pattern for the transmission/reception may be indicated to UE-C 606. For aperiodic transmissions, a TDD pattern of the aperiodic transmission may be indicated to UE-C 606 for performing interference management. An indication of a measured reference signal received power (RSRP) may likewise be provided to the interference management UE. For example, UE-A 602 may indicate to UE-C 606 that at time $T_0$ UE-A 602 expects to receive a transmission from UE-B 604 based on a particular RSRP. UE-C 606 may determine based on the particular RSRP at UE-A 602 that a transmission of UE-C 606 may not cause a threshold level of interference at UE-A 602. Thus, UE-C 606 may proceed to communicate with UE-D 608. Alternatively, UE-C 606 may determine based on the RSRP at UE-A 602 that the transmission may exceed the threshold level of interference at UE-A 602 and refrain from communicating with UE-D 608 or select a different resource for performing the communication with UE-D 608.

In other configurations, the UE that performs the interference mitigation may indicate a change in the network traffic (e.g., a change in traffic load over aligned beams, a change in traffic periodicity, etc.). UE-C 606 may additionally receive an indication of a conclusion of communications (e.g., between UE-A 602 and UE-B 604), which may be indicative of available resources. A resource partition may also be negotiated between the UE-A 602 and UE-C 606. For example, the UEs 602/606 may use the RRC connection maintained for interference management to negotiate a partition location of the transmission resources. If UE-C 606 determines that a communication with UE-D 608, such as a safety message, utilizes a small portion of bandwidth, UE-C 606 may indicate to UE-A 602 that a remaining portion of the bandwidth may be utilized by UE-A 602 when transmitting on the same resources. For instance, UE-C 606 may negotiate with UE-A 602 to transmit on RBs 1-10, while UE-A 602 transmits a larger packet on RBs 10-100 so that the UEs 602/606 do not interfere with each other. UE-C 606 may additionally provide an indication to UE-D 608 to adjust the resources accordingly.

The RRC connection maintained for interference mitigation may be used for resource exclusion. That is, a UE may completely exclude one or more resources to mitigate interference to peer UEs on such resources. A resource exclusion determination may be based on a priority of the network traffic/service. For example, UE-C 606 may determine that a transmission of UE-C 606 has a higher priority than a transmission of UE-A 602. Thus, UE-C 606 may proceed with performing the transmission and may provide an indication to UE-A 602 to refrain from transmitting on the same resources as UE-C 606. Resource exclusion may be based on a measured and reported RSRP. For example, if the RSRP from UE-B 604 to UE-A 602 is greater than a power times the RSRP from UE-C 606 to UE-A 602 over a dominant beam, UE-C 606 may determine not to exclude the resources since the transmission from UE-C 606 may not cause a threshold level of interference to UE-A 602 receiving from UE-B 604.

The UE may provide an indication to the interference management UE of resources that may not be excluded (e.g., based a priority of the data transmission). For example, UE-A 602 may provide a request to UE-B 604 to perform a resource reevaluation/reselection via feedback transmitted over a physical sidelink feedback channel (PSFCH) or the maintained RRC connection based on a priority of a transmission indicated to UE-A 602 by UE-C 606. Further, UE-A 602 may notify UE-C 606 of the upcoming transmission from UE-B 604 so that UE-C 606 may indicate to UE-B 604 that UE-C 606 may not perform a resource adjustment based on a priority of the transmission of UE-C 606. A peer UE that uses the RRC connection for interference mitigation may provide an indication to the UE of a change in a link quality with another UE. For instance, if UE-A 602 notifies UE-C 606 that the link quality between UE-A 602 and UE-B 604 has degraded, UE-C 606 may increase resource exclusion criteria for beams directed toward UE-A 602 that may interfere with a transmission from UE-B 604. UE-C 606 may receive a periodic update indicative of the link quality between UE-A 602 and UE-B 604 to adjust the resource exclusion criteria.

UE-A 602 and UE-C 606 may provide periodic updates to each other regarding interference management information. The periodic updates may be transmitted based on a timer maintained by at least one of the UEs 602/606. If the periodic interference management update timer is enabled, one of the UEs 602/606 may notify the other UE 606/602 of a traffic load/pattern, a link measurement determined via CSI-RS or DMRS, a link activation/deactivation status, etc., upon an expiration of the interference management update timer. The interference management information may alternatively be updated in an event triggered manner. For example, an interference management report may be transmitted via the RRC connection when a change in the network traffic/link quality is determined. In some configurations, the interference management information may be updated based on a combination of both periodic updates and event triggering. For example, the interference management information may be updated periodically and also when a triggering event occurs.

Figure 7A:
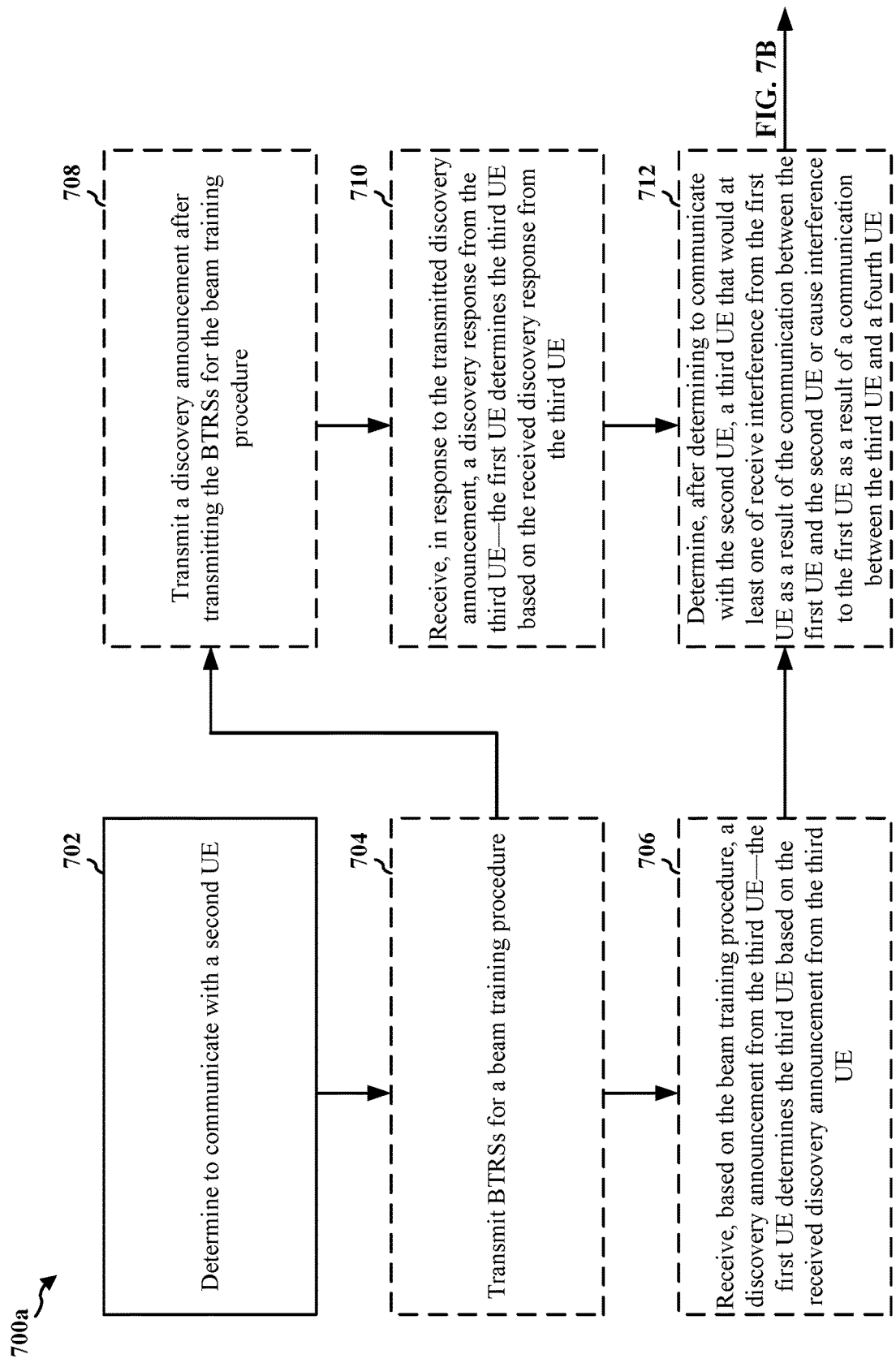

FIGS. 7A-7B are flowcharts 700-750 for a method of wireless communication. The method may be performed by a UE (e.g., the first UE 104a, 402, 602, the third UE 140c, 406, 606; the apparatus 802; etc.), which may include the memory 360 and which may be the entire first UE 104a, 402, 602 or third UE 104c, 406, 606 or a component of the first UE 104a, 402, 602 or the third UE 104c, 406, 606, such as the TX processor 368, the RX processor 356, and/or the controller/processor 359.

At 702, the UE may determine to communicate with a second UE. For example, referring to FIG. 4, the first UE 402 may determine, at 408, to communicate with the second UE 404.

At 704, the UE may transmit BTRSs for a beam training procedure. For example, referring to FIGS. 4-5, the first UE 402 may transmit, at 410, a BTRS for a beam training procedure with the third UE 406. Alternatively, the first UE 402 may transmit, at 410, BTRS(s) in a plurality of RACH directions, such that the third UE 406 may receive a BTRS via a RACH directions of the plurality of RACH directions for performing the beam training procedure with the first UE 402. In aspects, transmission of the BTRS(s) may correspond to transmission of the beam pilots 506a-506b during the beam training period 502.

If the UE transmits the BTRS to perform the beam training procedure with the third UE, the UE may receive, at 706, based on the beam training procedure, a discovery announcement from the third UE—the first UE determines the third UE based on the received discovery announcement from the third UE. For example, referring to FIG. 4, if the BTRS(s) transmitted, at 410, by the first UE 402 are directed toward the third UE 406, the first UE 402 may receive, at 412, a discovery announcement from the third UE 406 indicating that the third UE 406 authorizes communication with the first UE 402 based on the received BTRS(s). The first UE 402 may determine an identifier (ID) of the third UE 406 via the discovery announcement received from the third UE 406 and transmit, at 414, a discovery response message to the third UE 406 indicative of intentions to communicate with the third UE 406.

Alternatively, if the UE transmits the BTRSs for the beam training procedure in the plurality of RACH directions, the UE may transmit, at 708, a discovery announcement after transmitting the BTRSs for the beam training procedure. For example, referring to FIG. 4, after the first UE 402 transmits, at 410, the BTRS(s) in the plurality of RACH directions, the first UE 402 may transmit, at 412, a discovery announcement in the plurality of RACH directions, such that the third UE 406 may receive the discovery announcement via a RACH direction of the plurality of RACH directions.

At 710, the UE may receive, in response to the transmitted discovery announcement, a discovery response from the third UE—the first UE determines the third UE based on the received discovery response from the third UE. For example, referring to FIG. 4, the first UE 402 may receive, at 414, a discovery response message from the third UE 406 based on the discovery announcement of the first UE 402 being received, at 412, by the third UE 406. The first UE 402 may determine an ID of the third UE 406 via the discovery response message received, at 414, from the third UE 406, where the discovery response message may be indicative of communication intentions of the third UE 406 with the first UE 402.

At 712, the UE may determine, after determining to communicate with the second UE, a third UE that would at least one of receive interference from the first UE as a result of the communication between the first UE and the second UE or cause interference to the first UE as a result of a communication between the third UE and a fourth UE. For example, referring to FIGS. 4 and 6, after the first UE 402, determines, at 408, to communicate with the second UE 404, the first UE 402 may determine, at 416, that the third UE 406 will receive interference from communications between the first UE 402 and the second UE 404, or cause interference to communications between the first UE 402 and the second UE 404. In further aspects, UE-A 602 may determine that communications between UE-A 602 and UE-B 604 will cause interference to communications between UE-C 606 and UE-D 608, or that the communications between UE-A 602 and UE-B 604 will receive interference from the communications between UE-C 606 and UE-D 608.

At 714, the UE may maintain or establish a RRC connection with the third UE upon a determination of a potential interference between the first UE and the third UE—the potential inference is one of a received interference in which the first UE receives interference from the third UE as a result of the communication between the third UE and the fourth UE, or a transmitted interference in which the first UE causes interference to the third UE as a result of the communication between the first UE and the second UE. For example, referring to FIG. 4, upon determining, at 416, that the third UE 406 will receive interference from communications of the first UE 402 and the second UE 404, or cause interference to communications of the first UE 402 and the second UE 404, the first UE 402 may establish, at 418, and/or maintain, at 418, a RRC connection with the third UE 406 for performing interference mitigation techniques.

At 716*a*, the UE may maintain the RRC connection when there is an existing RRC connection between the first UE and the third UE. For example, referring to FIG. 4, if the first UE 402 and third UE 406 are already RRC connected, the first UE 402 may maintain, at 418, the RRC connection with the third UE 406.

At 716*b*, the UE may establish the RRC connection when the RRC connection does not exist between the first UE and the third UE. For example, referring to FIG. 4, if the first UE 402 and third UE 406 are not already RRC connected, the first UE 402 may establish, at 418, the RRC connection with the third UE 406, which may continue to be maintained, at 418/716*a*, by the first UE 402.

At 718, the UE may negotiate a resource partition between a first set of time-frequency resources for the communication between the first UE and the second UE and a second set of time-frequency resources for the communication between the third UE and the fourth UE—the first set of time-frequency resources and the second set of time-frequency resources is non-overlapping and the interference mitigation information is communicated in association with the negotiation. For example, referring to FIG. 4, the first UE 402 and the third UE 406 may negotiate a resource partition for communications between the first UE 402 and the second UE 404, and communications between the third UE 406 and a fourth UE, where the interference mitigation techniques may be performed in association with the negotiated resources.

At 720, the UE may determine a change in a traffic load of the communication with the second UE or a change in a link quality of the communication with the second UE—the interference mitigation information is communicated based on the determined change in the traffic load or the link quality. For example, referring to FIG. 4, the first UE 402 may determine, at 422, a change in traffic load and/or a change in link quality for communication with the second UE 404, where the interference mitigation techniques may be performed in association with the change in the traffic load and/or the change in the link quality. For instance, the interference mitigation information (e.g., communicated, at 424, via the RRC connection) may include information indicating a change in a link quality for the communication between the first UE 402 and the second UE 404. The interference mitigation information (e.g., communicated, at 424, via the RRC connection) may likewise include information indicating a change in communication traffic (e.g., determined at 422) for the communication between the first UE 402 and the second UE 404. The indicated change in the communication traffic (e.g., determined at 422) may include a change in a traffic load or a change in traffic periodicity. Further, the indicated change in the communication traffic (e.g., determined at 422) may include at least one of information indicating an end of service between the first UE 402 and the second UE 404, or potential available resources that were being used by the first UE 402 and the second UE 404 for the communication.

At 722, the UE may communicate, with the third UE through the RRC connection, the interference mitigation information associated with at least one of the communication between the first UE and the second UE or the communication between the third UE and the fourth UE. For example, referring to FIG. 4, the first UE 402 may communicate, at 424, interference mitigation information to the third UE 406 via the RRC connection. In aspects, the communication, at 424, of the interference mitigation information to the third UE, 406, may be based on the determination, at 416, that the third UE 406 will receive interference from, or cause interference to, communication between the first UE 402 and the second UE 404. The interference mitigation information (e.g., communicated, at 424, via the RRC connection) may include at least one of information indicating time-frequency resources for expected communication receptions by the first UE 402 from the second UE 404, information indicating time-frequency resources for expected communication transmissions from the first UE 402 to the second UE 404, information indicating time-frequency resources for expected communication receptions by the third UE 406 from the fourth UE, or information indicating time-frequency resources for expected communication transmissions from the third UE 406 to the fourth UE. The interference mitigation information (e.g., communicated, at 424, via the RRC connection) may include at least one of a RSRP associated with communication received at the first UE 402 from the second UE 404, an RSRP associated with communication received at the first UE 402 from the third UE 406, or an RSRP associated with communication received at the third UE 406 from the first UE 402. The interference mitigation information may be communicated, at 424, periodically via the RRC connection based on a timer.

The interference mitigation information (e.g., communicated, at 424, via the RRC connection) may include information indicating at least one of a first set of time-frequency resources subject to potential interference from the third UE 406 in which the time-frequency resources are utilized by the first UE 402 to receive communication from the second UE 404, or a second set of time-frequency resources subject to potential interference from the first UE 402 in which the time-frequency resources are utilized by the third UE 406 to receive communication from the fourth UE. Hence, at 724, the UE may exclude, based on the communicated interference mitigation information, use of at least a subset of the second set of time-frequency resources for the communication with the second UE. For example, referring to FIG. 4, the first UE 402 may exclude, at 426, use of time-frequency resources that cause interference to the third UE 406, where the exclusion may be indicated via the interference mitigation information transmitted, at 424, to the third UE 406. The excluding (e.g., at 426) use of at least the subset of the second set of time-frequency resources for the communication with the second UE 404 may be based on a priority of the communication with the second UE 404. Additionally or alternatively, the excluding (e.g., at 426) use of at least the subset of the second set of time-frequency resources for the communication with the second UE 404 may be based on whether a RSRP for the communication between the first UE 402 and the second UE 404 is greater than a scalar value p times the RSRP for communication between the first UE 402 and the third UE 406. In further aspects, the first UE 402 may receive, at 424, interference mitigation information from the third UE 406, where the interference mitigation information may include information indicating that the third UE 406 cannot exclude use of the first set of time-frequency resources for the communication with the fourth UE. Accordingly, the first UE 402 may reselect, based on the communicated interference mitigation information, at least a subset of the first set of time-frequency resources for the communication with the second UE 404.

At 726, the UE may communicate with the second UE—one of the transmitted/received interference between the first UE and the third UE during the communication between the first UE and the second UE is based on the communicated interference mitigation information. For example, referring to FIG. 4, the first UE 402 may communicate, at 428, with the second UE 404 based on the interference mitigation information communicated, at 424, between the first UE 402 and the third UE 406 via the RRC connection.

Figure 8:
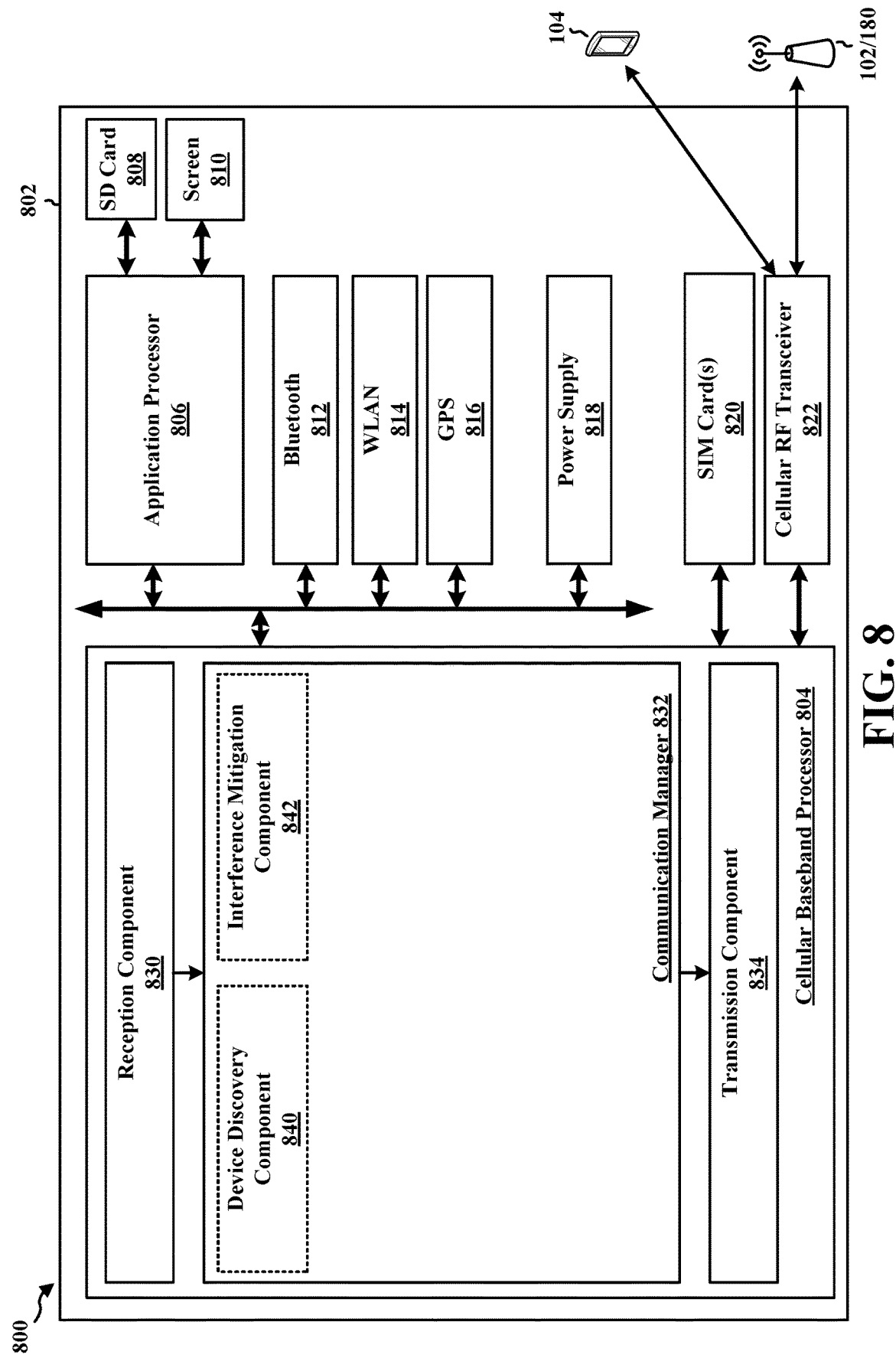
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/ memory. The computer-readable medium/memory may be non-transitory. The cellular baseband processor 804 is responsible for general processing, including the execution of software stored on the computer-readable medium/ memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a device discovery component 840 that is configured, e.g., as described in connection with 702-710, to determine to communicate with a second UE; to transmit BTRSs for a beam training procedure; to receive, based on the beam training procedure, a discovery announcement from the third UE—the first UE determines the third UE based on the received discovery announcement from the third UE; to transmit a discovery announcement after transmitting the BTRSs for the beam training procedure; and to receive, in response to the transmitted discovery announcement, a discovery response from the third UE—the first UE determines the third UE based on the received discovery response from the third UE.

The communication manager 832 includes an interference mitigation component 842 that is configured, e.g., as described in connection with 712-726, to maintain or establish a RRC connection with the third UE upon a determination of a potential interference between the first UE and the third UE—the potential inference is one of a received interference in which the first UE receives interference from the third UE as a result of the communication between the third UE and the fourth UE, or a transmitted interference in which the first UE causes interference to the third UE as a result of the communication between the first UE and the second UE; to negotiate a resource partition between a first set of time-frequency resources for the communication between the first UE and the second UE and a second set of time-frequency resources for the communication between the third UE and the fourth UE—the first set of time-frequency resources and the second set of time-frequency resources is non-overlapping and interference mitigation information is communicated in association with the negotiation; to determine a change in a traffic load of the communication with the second UE or a change in a link quality of the communication with the second UE—the interference mitigation information is communicated based on the determined change in the traffic load or the link quality; to communicate, with the third UE through the RRC connection, the interference mitigation information associated with at least one of the communication between the first UE and the second UE or the communication between the third UE and the fourth UE; to exclude, based on the communicated interference mitigation information, use of at least a subset of the second set of time-frequency resources for the communication with the second UE; and to communicate with the second UE—one of the transmitted/received interference between the first UE and the third UE during the communication between the first UE and the second UE is based on the communicated interference mitigation information.

The apparatus may include additional components that perform each of the blocks of the algorithm in the aforementioned flowcharts of FIGS. 7A-7B. As such, each block in the aforementioned flowcharts of FIGS. 7A-7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining to communicate with a second UE; means for maintaining or means for establishing a RRC connection with a third UE upon a determination of a potential interference between the first UE and the third UE, the potential inference being one of a received interference in which the first UE receives interference from the third UE as a result of communication between the third UE and a fourth UE, or a transmitted interference in which the first UE causes interference to the third UE as a result of communication between the first UE and the second UE; and means for communicating, with the third UE through the RRC connection, interference mitigation information associated with at least one of the communication between the first UE and the second UE or the communication between the third UE and the fourth UE. The means for maintaining or the means for establishing the RRC connection with the third UE may be further configured to: maintain the RRC connection when there is an existing RRC connection between the first UE and the third UE; and establish the RRC connection when there is not an existing RRC connection between the first UE and the third UE.

The apparatus 802 further includes means for communicating with the second UE, wherein one of the transmitted interference caused by the first UE to the third UE during the communication between the first UE and the second UE is based on the communicated interference mitigation information, or an interference received at the first UE from the third UE during the communication between the first UE and the second UE is based on the communicated interference mitigation information. The apparatus 802 further includes means for determining, after determining to communicate with the second UE, the third UE that would at least one of receive interference from the first UE as a result of the communication between the first UE and the second UE or cause interference to the first UE as a result of the communication between the third UE and the fourth UE. The apparatus 802 further includes means for transmitting BT-RSs for a beam training procedure; and means for receiving, based on the beam training procedure, a discovery announcement from the third UE, where the first UE determines the third UE based on the received discovery announcement from the third UE. The apparatus 802 further includes means for transmitting BT-RSs for a beam training procedure; means for transmitting a discovery announcement after transmitting the BT-RSs for the beam training procedure; means for receiving, in response to the transmitted discovery announcement, a discovery response from the third UE, where the first UE determines the third UE based on the received discovery response from the third UE. The apparatus 802 further includes means for negotiating a resource partition between a first set of time-frequency resources for the communication between the first UE and the second UE and a second set of time-frequency resources for the communication between the third UE and the fourth UE, the first set of time-frequency resources and the second set of time-frequency resources being non-overlapping, wherein the interference mitigation information is communicated in association with the negotiation. The apparatus 802 further includes means for excluding, based on the communicated interference mitigation information, use of at least a subset of the second set of time-frequency resources for the communication with the second UE. The apparatus 802 further includes means for determining a change in a traffic load of the communication with the second UE or a change in a link quality of the communication with the second UE, wherein the interference mitigation information is communicated based on the determined change in the traffic load or the link quality.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, even if the first UE and the third UE do not intend to communicate data with each other, the first UE and the third UE may determine to be RRC connected for managing potential interference to the first communication link and/or the second communication link. If the first UE and the third UE already have an existing RRC connection with each other, the first UE and the third UE may maintain the RRC connection. If the first UE and the third UE do not have an existing RRC connection with each other, the first UE and the third UE may establish the RRC connection. The potential interference may be decreased or avoided based on interference mitigation information communicated between the first UE and the third UE via the RRC connection. For example, the interference mitigation information may indicate an adjustment to time-frequency resources that are to be used by each of the UEs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, comprising: determining to communicate with a second UE; maintaining or establishing a RRC connection with a third UE upon a determination of a potential interference between the first UE and the third UE, the potential inference being one of a received interference in which the first UE receives interference from the third UE as a result of communication between the third UE and a fourth UE, or a transmitted interference in which the first UE causes interference to the third UE as a result of communication between the first UE and the second UE; and communicating, with the third UE through the RRC connection, interference mitigation information associated with at least one of the communication between the first UE and the second UE or the communication between the third UE and the fourth UE.

Aspect 2 may be combined with aspect 1 and further includes communicating with the second UE, wherein one of the transmitted interference caused by the first UE to the third UE during the communication between the first UE and the second UE is based on the communicated interference mitigation information, or an interference received at the first UE from the third UE during the communication between the first UE and the second UE is based on the communicated interference mitigation information.

Aspect 3 may be combined with any of aspects 1-2 and includes that the maintaining or establishing the RRC connection with the third UE further includes: maintaining the RRC connection when there is an existing RRC connection between the first UE and the third UE; and establishing the RRC connection when there is not an existing RRC connection between the first UE and the third UE.

Aspect 4 may be combined with any of aspects 1-3 and further includes determining, after determining to communicate with the second UE, the third UE that would at least one of receive interference from the first UE as a result of the communication between the first UE and the second UE or cause interference to the first UE as a result of the communication between the third UE and the fourth UE.

Aspect 5 may be combined with any of aspects 1-4 and further includes transmitting beam training (BT) reference signals (RSs) (BT-RSs) for a BT procedure; and receiving, based on the BT procedure, a discovery announcement from the third UE, where the first UE determines the third UE based on the received discovery announcement from the third UE.

Aspect 6 may be combined with any of aspects 1-4 and further includes transmitting BT-RSs for a BT procedure; transmitting a discovery announcement after transmitting the BT-RSs for the BT procedure; receiving, in response to the transmitted discovery announcement, a discovery response from the third UE, where the first UE determines the third UE based on the received discovery response from the third UE.

Aspect 7 may be combined with any of aspects 1-6 and includes that the interference mitigation information includes at least one of information indicating time-frequency resources for expected communication receptions by the first UE from the second UE, information indicating time-frequency resources for expected communication transmissions from the first UE to the second UE, information indicating time-frequency resources for expected communication receptions by the third UE from the fourth UE, or information indicating time-frequency resources for expected communication transmissions from the third UE to the fourth UE.

Aspect 8 may be combined with any of aspects 1-7 and includes that the interference mitigation information includes at least one of a RSRP associated with communication received at the first UE from the second UE, an RSRP associated with communication received at the first UE from the third UE, or an RSRP associated with communication received at the third UE from the first UE.

Aspect 9 may be combined with any of aspects 1-8 and includes that the interference mitigation information includes information indicating a change in communication traffic for the communication between the first UE and the second UE.

Aspect 10 may be combined with any of aspects 1-9 and includes that the indicated change in the communication traffic includes a change in a traffic load or a change in traffic periodicity.

Aspect 11 may be combined with any of aspects 1-10 and includes that the indicated change in the communication traffic includes at least one of information indicating an end of service between the first UE and the second UE, or potential available resources that were being used by the first UE and the second UE for the communication.

Aspect 12 may be combined with any of aspects 1-11 and further includes negotiating a resource partition between a first set of time-frequency resources for the communication between the first UE and the second UE and a second set of time-frequency resources for the communication between the third UE and the fourth UE, the first set of time-frequency resources and the second set of time-frequency resources being non-overlapping, wherein the interference mitigation information is communicated in association with the negotiation.

Aspect 13 may be combined with any of aspects 1-12 and includes that the interference mitigation information includes information indicating at least one of a first set of time-frequency resources subject to potential interference from the third UE in which the time-frequency resources are utilized by the first UE to receive communication from the second UE, or a second set of time-frequency resources subject to potential interference from the first UE in which the time-frequency resources are utilized by the third UE to receive communication from the fourth UE.

Aspect 14 may be combined with any of aspects 1-13 and further includes excluding, based on the communicated interference mitigation information, use of at least a subset of the second set of time-frequency resources for the communication with the second UE.

Aspect 15 may be combined with any of aspects 1-14 and includes that the excluding use of at least the subset of the second set of time-frequency resources for the communication with the second UE is based on a priority of the communication with the second UE.

Aspect 16 may be combined with any of aspects 1-15 and includes that the excluding use of at least the subset of the second set of time-frequency resources for the communication with the second UE is based on whether a RSRP for the communication between the first UE and the second UE is greater than a scalar value p times the RSRP for communication between the first UE and the third UE.

Aspect 17 may be combined with any of aspects 1-13 and includes that the interference mitigation information further includes information indicating that the third UE cannot exclude use of the first set of time-frequency resources for the communication with the fourth UE, the aspect further including reselecting, based on the communicated interference mitigation information, at least a subset of the first set of time-frequency resources for the communication with the second UE.

Aspect 18 may be combined with any of aspects 1-17 and includes that the interference mitigation information includes information indicating a change in a link quality for the communication between the first UE and the second UE.

Aspect 19 may be combined with any of aspects 1-18 and includes that the interference mitigation information is communicated periodically based on a timer.

Aspect 20 may be combined with any of aspects 1-19 and further includes determining a change in a traffic load of the communication with the second UE or a change in a link quality of the communication with the second UE, wherein the interference mitigation information is communicated based on the determined change in the traffic load or the link quality.

Aspect 21 is an apparatus for wireless communication including at least one processor coupled to a memory and configured to implement a method as in any of aspects 1-20.

Aspect 22 is an apparatus for wireless communication including means for implementing a method as in any of aspects 1-20.

Aspect 23 is a computer-readable medium storing computer executable code, where the code when executed by at least one processor causes the at least one processor to implement a method as in any of aspects 1-20.

What is claimed is:

1. A method of wireless communication of a first user equipment (UE), comprising:
    determining to communicate with a second UE;
    maintaining or establishing a radio resource control (RRC) connection with a third UE upon a determination of a potential interference between the first UE and the third UE, the potential interference being at least one of a received interference in which the first UE receives interference from the third UE as a result of communication between the third UE and a fourth UE, or a transmitted interference in which the first UE causes interference to the third UE as a result of communication between the first UE and the second UE; and
    communicating, with the third UE through the RRC connection, interference mitigation information associated with at least one of the communication between the first UE and the second UE or the communication between the third UE and the fourth UE, wherein the interference mitigation information comprises at least one of a reference signal received power (RSRP) associated with communication received at the first UE from the second UE, an RSRP associated with communication received at the first UE from the third UE, or an RSRP associated with communication received at the third UE from the first UE.

2. The method of claim 1, further comprising communicating with the second UE, wherein one of the transmitted interference caused by the first UE to the third UE during the communication between the first UE and the second UE is based on the communicated interference mitigation information, or an interference received at the first UE from the third UE during the communication between the first UE and the second UE is based on the communicated interference mitigation information.

3. The method of claim 1, wherein the maintaining or establishing the RRC connection with the third UE comprises:
    maintaining the RRC connection when there is an existing RRC connection between the first UE and the third UE; and
    establishing the RRC connection when there is not an existing RRC connection between the first UE and the third UE.

4. The method of claim 1, further comprising determining, after determining to communicate with the second UE, the third UE that would at least one of receive interference from the first UE as a result of the communication between the first UE and the second UE or cause interference to the first UE as a result of the communication between the third UE and the fourth UE.

5. The method of claim 4, further comprising:
    transmitting beam training (BT) reference signals (RSs) (BT-RSs) for a BT procedure; and
    receiving, based on the BT procedure, a discovery announcement from the third UE,
    wherein the first UE determines the third UE based on the received discovery announcement from the third UE.

6. The method of claim 4, further comprising:
    transmitting beam training (BT) reference signals (RSs) (BT-RSs) for a BT procedure;
    transmitting a discovery announcement after transmitting the BT-RSs for the BT procedure; and
    receiving, in response to the transmitted discovery announcement, a discovery response from the third UE,
    wherein the first UE determines the third UE based on the received discovery response from the third UE.

7. The method of claim 1, wherein the interference mitigation information comprises at least one of information indicating time-frequency resources for expected communication receptions by the first UE from the second UE, information indicating time-frequency resources for expected communication transmissions from the first UE to the second UE, information indicating time-frequency resources for expected communication receptions by the third UE from the fourth UE, or information indicating time-frequency resources for expected communication transmissions from the third UE to the fourth UE.

8. The method of claim 1, wherein the interference mitigation information comprises information indicating a change in communication traffic for the communication between the first UE and the second UE.

9. The method of claim 8, wherein the indicated change in the communication traffic comprises a change in a traffic load or a change in traffic periodicity.

10. The method of claim 8, wherein the indicated change in the communication traffic comprises at least one of information indicating an end of service between the first UE and the second UE, or potential available resources that were being used by the first UE and the second UE for the communication.

11. The method of claim 1, further comprising negotiating a resource partition between a first set of time-frequency resources for the communication between the first UE and the second UE and a second set of time-frequency resources for the communication between the third UE and the fourth UE, the first set of time-frequency resources and the second set of time-frequency resources being non-overlapping, wherein the interference mitigation information is communicated in association with the negotiation.

12. The method of claim 1, wherein the interference mitigation information comprises information indicating at least one of a first set of time-frequency resources subject to potential interference from the third UE in which the time-frequency resources are utilized by the first UE to receive communication from the second UE, or a second set of time-frequency resources subject to potential interference from the first UE in which the time-frequency resources are utilized by the third UE to receive communication from the fourth UE.

13. The method of claim 12, further comprising excluding, based on the communicated interference mitigation information, use of at least a subset of the second set of time-frequency resources for the communication with the second UE.

14. The method of claim 13, wherein the excluding use of at least the subset of the second set of time-frequency resources for the communication with the second UE is based on a priority of the communication with the second UE.

15. The method of claim 13, wherein the excluding use of at least the subset of the second set of time-frequency resources for the communication with the second UE is based on whether the RSRP associated with the communication received at the first UE from the second UE is greater than a scalar value p times the RSRP associated with the communication received at the first UE from the third UE.

16. The method of claim 12, wherein the interference mitigation information further comprises information indicating that the third UE cannot exclude use of the first set of time-frequency resources for the communication with the fourth UE, the method further comprising reselecting, based on the communicated interference mitigation information, at least a subset of the first set of time-frequency resources for the communication with the second UE.

17. The method of claim 1, wherein the interference mitigation information comprises information indicating a change in a link quality for the communication between the first UE and the second UE.

18. The method of claim 1, wherein the interference mitigation information is communicated periodically based on a timer.

19. The method of claim 1, further comprising determining a change in a traffic load of the communication with the second UE or a change in a link quality of the communication with the second UE, wherein the interference mitigation information is communicated based on the determined change in the traffic load or the link quality.

20. An apparatus for wireless communication of a first user equipment (UE), comprising:
a memory; and
at least one processor coupled to the memory and configured to:
determine to communicate with a second UE;
maintain or establish a radio resource control (RRC) connection with a third UE upon a determination of a potential interference between the first UE and the third UE, the potential interference being at least one of a received interference in which the first UE receives interference from the third UE as a result of communication between the third UE and a fourth UE, or a transmitted interference in which the first UE causes interference to the third UE as a result of communication between the first UE and the second UE; and
communicate, with the third UE through the RRC connection, interference mitigation information associated with at least one of the communication between the first UE and the second UE or the communication between the third UE and the fourth UE, wherein the interference mitigation information comprises at least one of a reference signal received power (RSRP) associated with communication received at the first UE from the second UE, an RSRP associated with communication received at the first UE from the third UE, or an RSRP associated with communication received at the third UE from the first UE.

21. The apparatus of claim 20, wherein the at least one processor is further configured to communicate with the second UE, wherein one of the transmitted interference caused by the first UE to the third UE during the communication between the first UE and the second UE is based on the communicated interference mitigation information, or an interference received at the first UE from the third UE during the communication between the first UE and the second UE is based on the communicated interference mitigation information.

22. The apparatus of claim 20, wherein to maintain or establish the RRC connection with the third UE the at least one processor is further configured to:
maintain the RRC connection when there is an existing RRC connection between the first UE and the third UE; and
establish the RRC connection when there is not an existing RRC connection between the first UE and the third UE.

23. The apparatus of claim 20, wherein the at least one processor is further configured to determine, after determining to communicate with the second UE, the third UE that would at least one of receive interference from the first UE as a result of the communication between the first UE and the second UE or cause interference to the first UE as a result of the communication between the third UE and the fourth UE.

24. The apparatus of claim 23, wherein the at least one processor is further configured to:
transmit beam training (BT) reference signals (RSs) (BT-RSs) for a BT procedure; and
receive, based on the BT procedure, a discovery announcement from the third UE,
wherein the first UE determines the third UE based on the received discovery announcement from the third UE.

25. The apparatus of claim 23, wherein the at least one processor is further configured to:
transmit beam training (BT) reference signals (RSs) (BT-RSs) for a BT procedure;
transmit a discovery announcement after transmitting the BT-RSs for the BT procedure; and
receive, in response to the transmitted discovery announcement, a discovery response from the third UE,
wherein the first UE determines the third UE based on the received discovery response from the third UE.

26. The apparatus of claim 20, wherein the interference mitigation information comprises at least one of information indicating time-frequency resources for expected communication receptions by the first UE from the second UE, information indicating time-frequency resources for expected communication transmissions from the first UE to the second UE, information indicating time-frequency resources for expected communication receptions by the third UE from the fourth UE, or information indicating time-frequency resources for expected communication transmissions from the third UE to the fourth UE.

27. The apparatus of claim 20, wherein the interference mitigation information comprises information indicating a change in communication traffic for the communication between the first UE and the second UE.

28. The apparatus of claim 27, wherein the indicated change in the communication traffic comprises a change in a traffic load or a change in traffic periodicity.

29. The apparatus of claim 27, wherein the indicated change in the communication traffic comprises at least one of information indicating an end of service between the first UE and the second UE, or potential available resources that were being used by the first UE and the second UE for the communication.

30. The apparatus of claim 20, wherein the at least one processor is further configured to negotiate a resource partition between a first set of time-frequency resources for the communication between the first UE and the second UE and a second set of time-frequency resources for the communication between the third UE and the fourth UE, the first set of time-frequency resources and the second set of time-frequency resources being non-overlapping, wherein the at least one processor is configured to communicate the interference mitigation information in association with the negotiation.

31. The apparatus of claim 20, wherein the interference mitigation information comprises information indicating at least one of a first set of time-frequency resources subject to potential interference from the third UE in which the time-frequency resources are utilized by the first UE to receive communication from the second UE, or a second set of time-frequency resources subject to potential interference from the first UE in which the time-frequency resources are utilized by the third UE to receive communication from the fourth UE.

32. The apparatus of claim 31, wherein the at least one processor is further configured to exclude, based on the communicated interference mitigation information, use of at least a subset of the second set of time-frequency resources for the communication with the second UE.

33. The apparatus of claim 32, wherein the at least one processor is configured to exclude the use of at least the subset of the second set of time-frequency resources for the communication with the second UE based on a priority of the communication with the second UE.

34. The apparatus of claim 32, wherein the at least one processor is configured to exclude the use of at least the subset of the second set of time-frequency resources for the communication with the second UE based on whether the RSRP associated with the communication received at the first UE from the second UE is greater than a scalar value p times the RSRP associated with the communication received at the first UE from the third UE.

35. The apparatus of claim 31, wherein the interference mitigation information further comprises information indicating that the third UE cannot exclude use of the first set of time-frequency resources for the communication with the fourth UE, the at least one processor further configured to reselect, based on the communicated interference mitigation information, at least a subset of the first set of time-frequency resources for the communication with the second UE.

36. The apparatus of claim 20, wherein the interference mitigation information comprises information indicating a change in a link quality for the communication between the first UE and the second UE.

37. The apparatus of claim 20, wherein the at least one processor is configured to communicate the interference mitigation information periodically based on a timer.

38. The apparatus of claim 20, wherein the at least one processor is further configured to determine a change in a traffic load of the communication with the second UE or a change in a link quality of the communication with the second UE, wherein the at least one processor is configured to communicate the interference mitigation information based on the determined change in the traffic load or the link quality.

39. An apparatus for wireless communication of a first user equipment (UE), comprising:
means for determining to communicate with a second UE;
means for maintaining or means for establishing a radio resource control (RRC) connection with a third UE upon a determination of a potential interference between the first UE and the third UE, the potential interference being at least one of a received interference in which the first UE receives interference from the third UE as a result of communication between the third UE and a fourth UE, or a transmitted interference in which the first UE causes interference to the third UE as a result of communication between the first UE and the second UE; and
means for communicating, with the third UE through the RRC connection, interference mitigation information associated with at least one of the communication between the first UE and the second UE or the communication between the third UE and the fourth UE, wherein the interference mitigation information comprises at least one of a reference signal received power (RSRP) associated with communication received at the first UE from the second UE, an RSRP associated with communication received at the first UE from the third UE, or an RSRP associated with communication received at the third UE from the first UE.

40. The apparatus of claim 39, further comprising means for communicating with the second UE, wherein one of the transmitted interference caused by the first UE to the third UE during the communication between the first UE and the second UE is based on the communicated interference mitigation information, or an interference received at the first UE from the third UE during the communication between the first UE and the second UE is based on the communicated interference mitigation information.

41. The apparatus of claim 39, wherein the means for maintaining or the means for establishing the RRC connection with the third UE is further configured to:
maintain the RRC connection when there is an existing RRC connection between the first UE and the third UE; and
establish the RRC connection when there is not an existing RRC connection between the first UE and the third UE.

42. The apparatus of claim 39, further comprising means for determining, after determining to communicate with the second UE, the third UE that would at least one of receive interference from the first UE as a result of the communication between the first UE and the second UE or cause interference to the first UE as a result of the communication between the third UE and the fourth UE.

43. The apparatus of claim 42, further comprising:
means for transmitting beam training (BT) reference signals (RSs) (BT-RSs) for a BT procedure; and
means for receiving, based on the BT procedure, a discovery announcement from the third UE,
wherein the first UE determines the third UE based on the received discovery announcement from the third UE.

44. The apparatus of claim 42, further comprising:
means for transmitting beam training (BT) reference signals (RSs) (BT-RSs) for a BT procedure;
means for transmitting a discovery announcement after transmitting the BT-RSs for the BT procedure; and
means for receiving, in response to the transmitted discovery announcement, a discovery response from the third UE,
wherein the first UE determines the third UE based on the received discovery response from the third UE.

45. The apparatus of claim 39, wherein the interference mitigation information comprises at least one of information indicating time-frequency resources for expected communication receptions by the first UE from the second UE, information indicating time-frequency resources for expected communication transmissions from the first UE to the second UE, information indicating time-frequency resources for expected communication receptions by the third UE from the fourth UE, or information indicating time-frequency resources for expected communication transmissions from the third UE to the fourth UE.

46. The apparatus of claim 39, wherein the interference mitigation information comprises information indicating a change in communication traffic for the communication between the first UE and the second UE.

47. The apparatus of claim 46, wherein the indicated change in the communication traffic comprises a change in a traffic load or a change in traffic periodicity.

48. The apparatus of claim 46, wherein the indicated change in the communication traffic comprises at least one of information indicating an end of service between the first UE and the second UE, or potential available resources that were being used by the first UE and the second UE for the communication.

49. The apparatus of claim 39, further comprising means for negotiating a resource partition between a first set of time-frequency resources for the communication between the first UE and the second UE and a second set of time-frequency resources for the communication between the third UE and the fourth UE, the first set of time-frequency resources and the second set of time-frequency resources being non-overlapping, wherein the interference mitigation information is communicated in association with the negotiation.

50. The apparatus of claim 39, wherein the interference mitigation information comprises information indicating at least one of a first set of time-frequency resources subject to potential interference from the third UE in which the time-frequency resources are utilized by the first UE to receive communication from the second UE, or a second set of time-frequency resources subject to potential interference from the first UE in which the time-frequency resources are utilized by the third UE to receive communication from the fourth UE.

51. The apparatus of claim 50, further comprising means for excluding, based on the communicated interference mitigation information, use of at least a subset of the second set of time-frequency resources for the communication with the second UE.

52. The apparatus of claim 51, wherein the excluding use of at least the subset of the second set of time-frequency resources for the communication with the second UE is based on a priority of the communication with the second UE.

53. The apparatus of claim 51, wherein the excluding use of at least the subset of the second set of time-frequency resources for the communication with the second UE is based on whether the RSRP associated with the communication received at the first UE from the second UE is greater than a scalar value p times the RSRP associated with the communication received at the first UE from the third UE.

54. The apparatus of claim 50, wherein the interference mitigation information further comprises information indicating that the third UE cannot exclude use of the first set of time-frequency resources for the communication with the fourth UE, the apparatus further comprising means for reselecting, based on the communicated interference mitigation information, at least a subset of the first set of time-frequency resources for the communication with the second UE.

55. The apparatus of claim 39, wherein the interference mitigation information comprises information indicating a change in a link quality for the communication between the first UE and the second UE.

56. The apparatus of claim 39, further comprising means for determining a change in a traffic load of the communication with the second UE or a change in a link quality of the communication with the second UE, wherein the interference mitigation information is communicated based on the determined change in the traffic load or the link quality.

57. A non-transitory computer-readable medium storing computer executable code, the code when executed by at least one processor of a first user equipment (UE) causes the at least one processor to:
determine to communicate with a second UE;
maintain or establish a radio resource control (RRC) connection with a third UE upon a determination of a potential interference between the first UE and the third UE, the potential interference being at least one of a received interference in which the first UE receives interference from the third UE as a result of communication between the third UE and a fourth UE, or a transmitted interference in which the first UE causes interference to the third UE as a result of communication between the first UE and the second UE; and
communicate, with the third UE through the RRC connection, interference mitigation information associated with at least one of the communication between the first UE and the second UE or the communication between the third UE and the fourth UE, wherein the interference mitigation information comprises at least one of a reference signal received power (RSRP) associated with communication received at the first UE from the second UE, an RSRP associated with communication received at the first UE from the third UE, or an RSRP associated with communication received at the third UE from the first UE.

58. The method of claim 1, wherein determining to communicate with the second UE comprises determining to communicate with the second UE via frequency range 2 (FR2), and wherein the interference mitigation information is communicated with the third UE through the RRC connection via the FR2.

* * * * *